A. AUSTERLITZ.
PRESSING OIL SEEDS IN OPEN PRESSES.
APPLICATION FILED OCT. 7, 1907.
992,534.
Patented May 16, 1911.
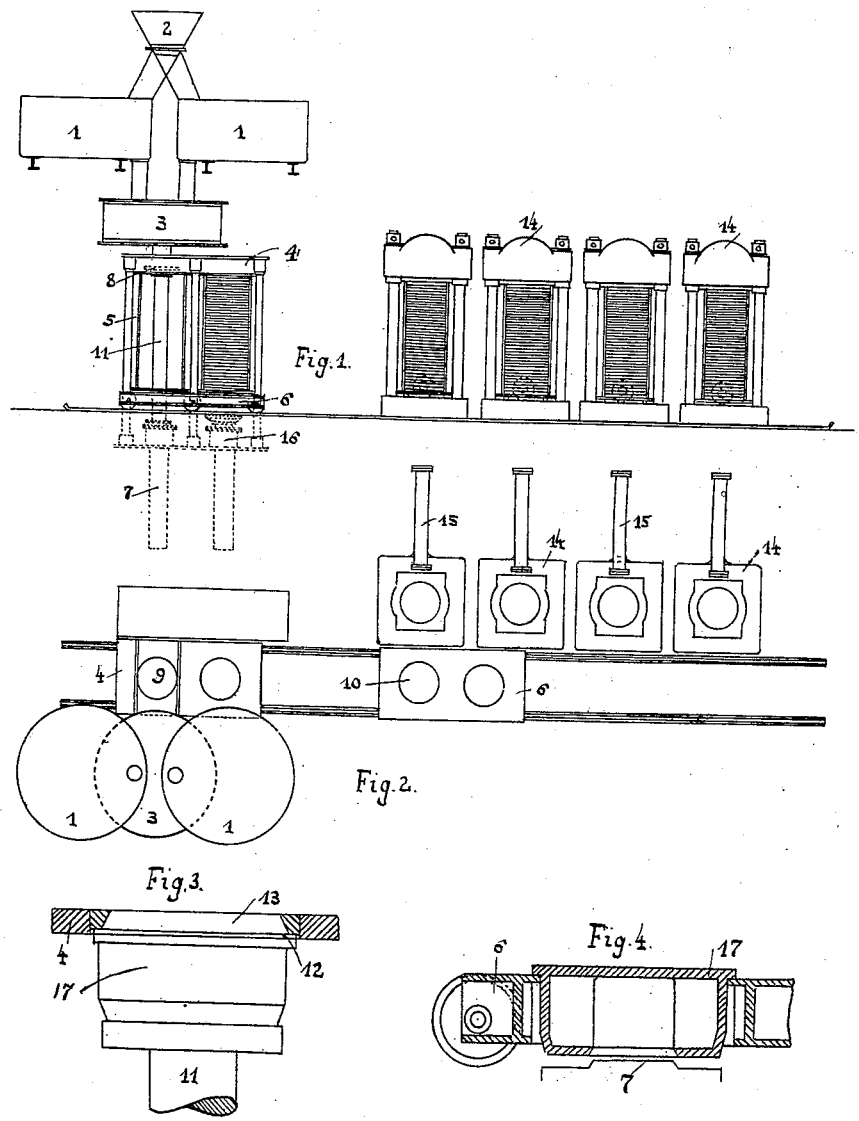

UNITED STATES PATENT OFFICE.

ALEXANDER AUSTERLITZ, OF GYÖR, AUSTRIA-HUNGARY.

PRESSING OIL-SEEDS IN OPEN PRESSES.

992,534. Specification of Letters Patent. Patented May 16, 1911.

Application filed October 7, 1907. Serial No. 396,229.

*To all whom it may concern:*

Be it known that I, ALEXANDER AUSTERLITZ, a subject of the King of Hungary, residing at Györ, in the Empire of Austria-Hungary, have invented a new and useful Improvement in Pressing Oil-Seeds in Open Presses, of which the following is a specification.

This invention relates to an improvement in the pressing of oil seeds in open presses.

In the accompanying drawings, Figure 1 shows in side elevation and Fig. 2 in plan an oil pressing apparatus of the kind set forth. Figs. 3 and 4 show details of the construction.

The preliminary processes to be undergone by the seed (cleaning, crushing, grinding and cooking) are carried out in the usual manner. The collecting vessel 3 serves the purpose that the ground seed when once it is finished cooking is immediately removed from the pan and discharged into the unheated collecting vessel whereby an excessive cooking thereof is avoided. From this collecting vessel the ground seed is taken to a pressure frame between plates. For the purpose of the filling there is provided a filling table 4. The filling takes place as follows: An open pressure frame 5 which serves as guide for the plates is brought under the filling table. This operation may conveniently be effected by means of a car 6 moved by any suitable mechanical means (preferably by hydraulic means). The lower part of the filling table 4 bears a cylinder 7, in which moves a hydraulic piston 11. The piston has at its upper end a plate 8 which serves to support the pressure plates and is of the same size as these latter. The car and the filling table are provided with openings 9, 10 of corresponding size for the passage of the piston.

In order to effect the filling, the piston 11 of the filling table is caused to rise until its top coincides with the lower edge of the opening in the filling table (Fig. 3). A pressure plate 12 is now laid upon the piston and the same is lowered beneath the surface of the table. The opening in the filling table together with the pressure plate closing it underneath now forms a box open above into which the roasted seed is poured. In order, however, that the layer of seed may not reach to the outermost edge of the pressure plate there is provided a mold 13; the seed is filled into this mold. The filling takes place by means of a pusher operating from the collecting vessel 3 to above the aperture in the table. When the seed has been placed within the ring 13, this latter is removed again and another pressure plate is placed on the top without the interposition of pressing cloths or the like. The piston is now caused to sink until the upper pressure plate has been depressed by the height of the mold 13, whereupon the mold is placed upon it and the filling of the next layer of seed can take place. This operation is continued until the pressure frame 5 is completely filled. In the meantime the seed can be a little compressed in order to utilize better the space. The pressure frame when filled is then taken to a press 14 by hydraulic or other convenient means. In the construction illustrated this removal is effected by means of the car 6 which moves upon rails. The car with the pressure frame is moved hydraulically to the press to be filled, pushed into the position illustrated in Fig. 2, and the frame is then drawn from the car into the press 14. This also in the illustrated construction takes place hydraulically. When the press is filled, the piston thereof (not shown in the drawing) is set in motion and the oil is pressed from the seed in the well known manner. The oil flows unhindered and open along the mass formed of the plates and the seed into the lower part of the press and is removed from thence.

As soon as the pressing is finished, the pressure piston is allowed to sink. As soon as it has attained its lowermost position, the pressure frame 5 together with the expressed cakes is taken out of the press. This may be effected by means of the hydraulic pushing cylinder 15. The piston thereof thrusts the frame upon the car 6. The car is then drawn to a discharging table together with the frame containing the cakes, which table is illustrated in the drawing as in one with the filling table. The discharging table can, however, be quite independent of the filling table, although in the case of small works it is preferable to effect the filling and the discharge on one table having only one opening.

For the discharging the cakes in the pressure frame are raised by means of the piston 16 until the uppermost plate can be removed; by gradually raising the piston all the plates and finished cakes can be removed separately. The cakes are then placed upon a cutting machine in which the crumbly edges are cut off. The parts cut off can be pressed over again.

Fig. 4 shows a constructional form of the transporting car 6.

In order to provide a fixed support for the lowermost pressure plate, a portion of the car is removable. This portion is raised on the lifting of the piston 11 or 16, and the plates are placed upon the upper surface of the part 17. The car can, according to the size of the works, be provided with one or two removable parts 17; in the latter case two pressing frames can be placed upon one car. If a combined filling and discharging table as shown in the drawing be made use of, then the one frame can be filled and the other can be discharged simultaneously. The filling and the discharging table as well as the presses are provided with devices for holding the car in the required positions. Finally it is also possible to carry out the filling, pressing and discharging in the press itself. In this case the pressing frame (the guides for the pressure plates) is immovable and the pressure columns or the side parts of the press may serve as the guides for the pressure plates.

What I claim is:

1. In combination with an oil press, a filling table provided with an aperture through which a pressure piston can pass, a series of pressure plates adapted to fit in said aperture, and a loose mold adapted to be placed upon successive pressure plates for the purpose of containing seed for each cake.

2. In combination with an oil press, a filling table provided with an apertured mold with an inclined wall for the purpose of containing seed for each cake, a series of pressure plates adapted to successively co-act with the mold, and means for holding the pressure plates successively in engagement with the mold.

In testimony whereof I have signed my name to this specification in the presence of two subscribing witnesses.

ALEXANDER AUSTERLITZ.

Witnesses:
 ROBERT W. HEINGARTNER,
 AUGUST FUGGER.